United States Patent
Ahn et al.

(10) Patent No.: US 6,266,458 B1
(45) Date of Patent: Jul. 24, 2001

(54) TUNABLE OPTICAL FILTERING SYSTEM USING FIBER-OPTIC POLARIMETRIC INTERFEROMETER

(75) Inventors: Joon Tae Ahn; Hak Kyu Lee; Min-Yong Jeon; Dong Sung Lim; Kyong-Hon Kim, all of Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/416,904

(22) Filed: Oct. 13, 1999

(30) Foreign Application Priority Data

Nov. 24, 1998 (KR) .................................. 98-50333

(51) Int. Cl.[7] ..................................................... G02B 6/00
(52) U.S. Cl. ................................... 385/11; 385/3; 385/27
(58) Field of Search ................................. 385/11, 1, 3, 4, 385/25, 26, 27

(56) References Cited

U.S. PATENT DOCUMENTS

| | | | |
|---|---|---|---|
| 5,062,684 | * 11/1991 | Clayton et al. | 385/27 |
| 5,289,552 | 2/1994 | Miller et al. | 385/73 |
| 5,295,205 | 3/1994 | Miller et al. | 385/1 |

OTHER PUBLICATIONS

Inoue et al., "Tunable Optical Multi/Demultiplexer For Optical FDM Transmission System," *IEEE Electronics Letters*, 21(9):387–389, 1985.

Okamoto et al., "All–Panda–Fibre Multi/Demultiplexer Utilising Polarisation Beat Phenomenon in Birefringent Fibres," *IEEE Electronics Letters*, 22(4):181–182, 1986.

Morioka et al., "More Than 100–Wavelength–Channel Picosecond Optical Pulse Generation From Single Laser Source Using Supercontinuum In Optical Fibres," *IEEE Electronics Letters*, 29(10):862–864, 1993.

* cited by examiner

Primary Examiner—Phan T. H. Palmer
(74) Attorney, Agent, or Firm—E. Russell Tarleton; Seed IP Law Group PLLC

(57) ABSTRACT

The present invention provides a tunable optical filtering system using fiber-optic polarimetric interferometer. The tunable optical filtering system using fiber-optic polarimetric interferometer in accordance with the present invention comprises a stabilization light source, a first polarization beam splitter, a first optical fiber node, a number of polarization maintaining optical fibers, a phase modulator, a stabilization electronics, a second optical fiber node, a second polarization beam splitter, and two wavelength division optical multiplexers. The stabilization light source supplies stabilization light. The first polarization beam splitter polarizes the stabilization light and the input light to be filtered and generates polarized light. The first optical fiber node connects the output of the first polarization beam splitter with polarization maintaining fibers with the angle of 45 degree between their birefringent axes and splits the polarized light. The number of polarization maintaining optical fibers carries the split light by the first optical fiber node. The phase modulator maintains phase difference between two birefringent axes of the polarization maintaining fibers. The stabilization electronics supply feedback signal to the phase modulator. The second optical fiber node connects the polarization maintaining fibers with the input of second polarization beam splitter with the angle of 45 degree between their birefringent axes, receives split light by said first optical fiber node, and generates interference signals. The second polarization beam splitter divides the interference signals into output signals by polarization axes. The wavelength division optical multiplexers divide the output signals into signals for the stabilization electronics and filtered signals by wavelengths.

3 Claims, 2 Drawing Sheets

PRIOR ART

TUNABLE OPTICAL FILTERING SYSTEM USING FIBER-OPTIC POLARIMETRIC INTERFEROMETER

TECHNICAL FIELD

The present invention relates to a tunable optical filtering system, and, more particularly, to a tunable optical filtering system using a fiber-optic polarimetric interferometer.

BACKGROUND OF THE INVENTION

Devices manipulating light signals in wavelength domain are essential to wavelength division multiplexed (WDM) communication systems, which are believed to be a promising way to achieve a few Tb/s of transmission capacity. Much research effort has been directed to optical interferometer filters in order to realize useful WDM devices such as a WDM channel divider, multiplexer, and demultiplexer.

However, since fiber interferometers are usually very sensitive to environmental perturbations such as temperature and vibration, a stabilization scheme is required to make the interferometers practical devices.

FIG. 1 shows a diagram illustrating an optical filtering system with a conventional transmission-type fiber-optic Mach-Zehnder interferometer (MZI) filter.

As shown in FIG. 1, a stabilized MZI filter includes an input terminal that receives input light, optical fiber nodes (optical fiber couplers), output terminals, and optical fibers. Light supplied to the input terminal is divided into two lights at the first optical fiber node. After propagating different optical paths, divided lights are combined and they interfere with each other at the second optical fiber node. If the polarization states of the two Interfered lights are assumed to be identical, the output of the optical filter can be described as follows:

$$I(\lambda) = \frac{I_o(\lambda)}{2}\left\{1 + \cos\left(\frac{2\pi n(\lambda)\Delta l}{\lambda}\right)\right\} \quad \text{[Equation 1]}$$

where $n(\lambda)$ is the refractive index of the fiber core and $\Delta l$ is the fiber length difference between the interferometer's two arms.

As shown in Equation 1, if optical fibers are subject to environmental perturbations such as temperature and vibration, refractive index and the length of the fiber vary and thereby the transmission wavelength of the filter changes. To overcome such difficulties, a stabilized fiber-optic MZI filter system was introduced. This technique has been disclosed in "Environmentally Stable Monolithic Mach-Zehnder Device," U.S. Pat. No. 5,295,205. However, when interferometers are implemented by optical fibers in the fiber-optic MZI filter system, the extinction ratio of the optical filter varies because polarization states of two interfered lights fluctuate slowly and randomly.

FIG. 2 shows a diagram illustrating an optical filtering system with the conventional fiber-optic polarimetric interferometer. As shown therein, it includes an input terminal, a polarizer, a polarization beam splitter (PBS), a first optical fiber node A, a second optical fiber node B, and output terminals.

The polarizer polarizes light supplied to the input terminal. Polarized light propagates through one of two birefringent axes of a polarization maintaining fiber (PMF). At the first optical fiber node A where the first PMF is connected to the second one with the angle of 45 degree between their birefringent axes, the polarized light is divided to the two birefringent axes of the second PMF with the same intensity. After the divided lights propagate through two birefringent axes of the second PMF, they are combined at the second optical fiber node B where the second PMF is connected to the third one with the angle of 45 degree between their birefringent axes.

There are two interference signals in the third PMF since each birefringent axis of the third PMF carries an interference signal. The two interference signals are separated from each other by the polarization beam splitter, and the two divided interference signals are supplied to the first output terminal and the second output terminal, respectively.

In FIG. 2, $n_e$ and $n_o$ represent two birefringent axes of a PMF. Point A and point B in the figure, where two PMF's are connected with 45 degree angle, are counterparts of the two optical fiber couplers of the MZI filter in FIG. 1. The two birefringent axes of the PMF located between the point A and the point B are counterparts of the two optical paths of the MZI filter in FIG. 1. Therefore, if the length of the optical fiber between A and B is represented by l and modal birefringence of the PMF is represented by B, output of the optical filter is described as follows.

$$I(\lambda) = \frac{I_o(\lambda)}{2}\left\{1 + \cos\left(\frac{2\pi n(\lambda)Bl}{\lambda}\right)\right\} \quad \text{[Equation 2]}$$

As shown in equation 2, transmission wavelength spacing is controlled by the length of PMF, l.

Extinction ratio variation due to the random fluctuation of the polarization states of two interfering signals can be solved in the PMF interferometer filter system since the PMF preserves the polarization states. In addition, the PMF interferometer filter system is less affected by environmental perturbations than MZI filter system since it has two optical paths in one optical fiber. Utilizing the above two advantages of the PMF interferometer filter system is discussed by K. Okamoto, T. Morioka, I. Yokohama, and J. Noda in an article entitled "All-Panda-Fiber Multi/Demultiplexer Utilizing Polarization Beat Phenomenon In Birefringent Fibers" in *IEE Electronics Letters* Vol. 22, No. 4, 181–182 (1986).

However, the stability problem resulting from environmental perturbations still remains, which must be solved in order to make the PMF interferometer filter system more practical.

SUMMARY OF THE INVENTION

The present invention provides a PMF interferometer filter system to remove the extinction ratio variation problem caused by polarization fluctuation by using a polarimetric interferometer scheme with PMF stabilizing transmission wavelengths with the help of the active phase tracking method with independent stabilization light source. The present invention also provides a tunable optical filtering system that easily changes transmission wavelength of the interferometer filter by changing the wavelength of the stabilization light source.

The tunable optical filtering system using a fiber-optic polarimetric interferometer disclosed herein includes a stabilization light source, a first polarization beam splitter, a first optical fiber node, a number of polarization-maintaining optical fibers, a phase modulator, stabilization electronics, a second optical fiber node, a second polarization beam splitter, and two wavelength division optical multiplexers. The stabilization light source supplies stabilization light. The first polarization beam splitter polarizes the stabilization light and the input light to be filtered and generates polarized light. The first optical fiber node connects the output of the first polarization beam splitter with polarization maintaining fibers with the angle of 45 degrees between their birefringent axes and splits the polarized light. The number of polarization maintaining optical fibers carries the split light by the first optical fiber node. The phase modulator maintains phase difference between the two birefringent axes of the polarization maintaining fibers. The stabilization electronics supply a feedback signal to the phase modulator. The second optical fiber node connects the polarization maintaining fibers with the input of the second polarization beam splitter with the angle of 45 degrees between their birefringent axes, receives split light from the first optical fiber node, and generates interference signals. The second polarization beam splitter divides the interference signals into output signals by the polarization axes. The wavelength division optical multiplexers divide the output signals into signals for the stabilization electronics and filtered signals by wavelengths.

The stabilization light source can include a light source whose wavelength is tunable in order to adjust the wavelength of said filtered signal.

The third optical fiber node installed between the first and the second optical fiber node is a connecting point where the two PMF's are spliced with the angle of 90 degrees between their birefringent axes.

BRIEF DESCRIPTION OF THE DRAWINGS

The embodiments of the present invention will be explained with reference to the accompanying drawings.

DETAILED DESCRIPTION OF THE PREFERRED EMBODIMENTS

Figure 1:
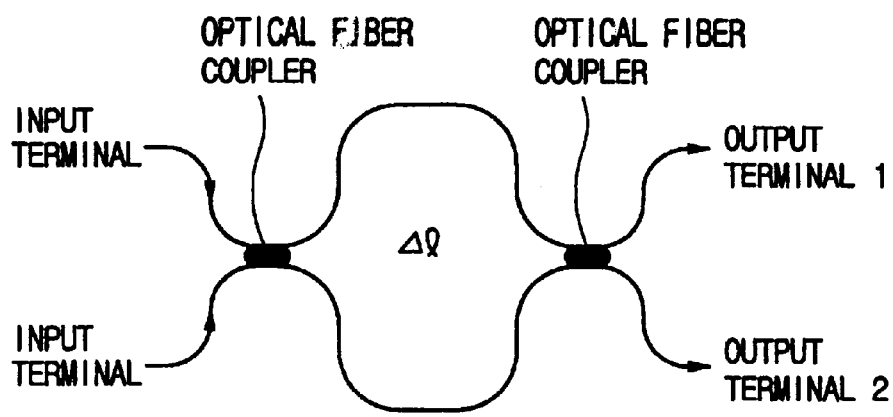
FIG. 1 is a diagram illustrating an optical filtering system with the conventional transmission-type wavelength tunable fiber-optic MZI filter.
Figure 2:
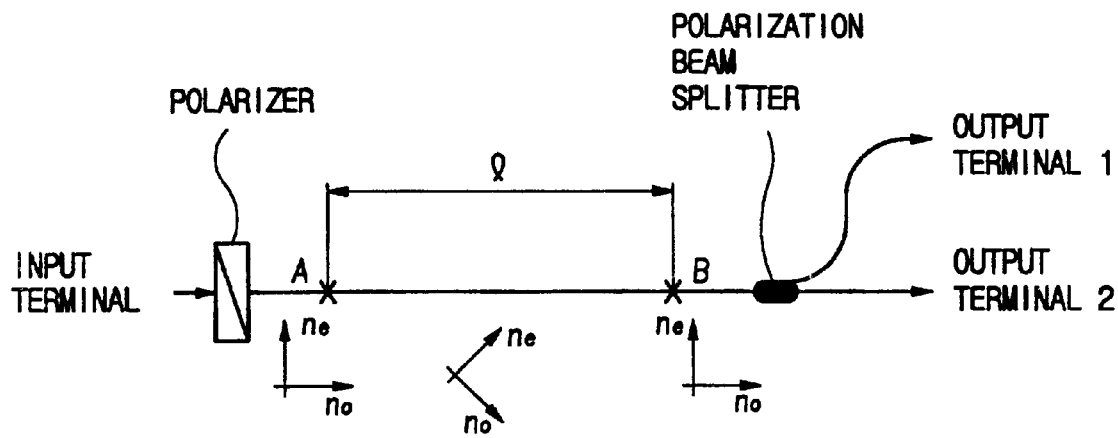
FIG. 2 is a diagram illustrating an optical filtering system with the conventional fiber-optic polarimetric interferometer.
Figure 3:
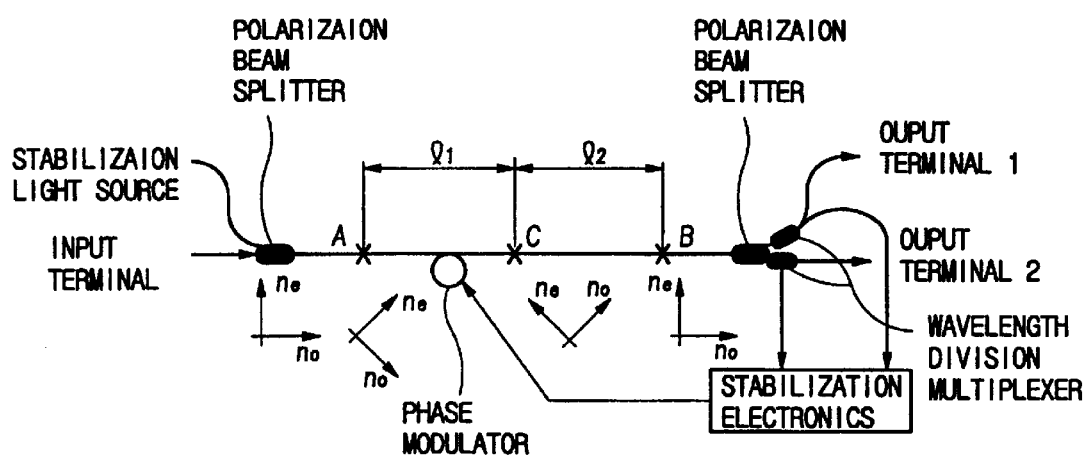
FIG. 3 is a diagram illustrating an embodiment of a stabilized tunable optical filtering system using fiber-optic polarimetric interferometer in accordance with the present invention.

FIG. 3 shows a diagram for illustrating an embodiment of a stabilized tunable optical filtering system using a fiber-optic polarimetric interferometer. The stabilized tunable optical filtering system using the fiber-optic polarimetric interferometer uses an active phase tracking (APT) method. The APT method is discussed in an article entitled "Elimination Of Drift In A Single-Mode Optical Fiber Interferometer Using A Piezoelectrically Stretched Coiled Fiber", in *Applied Optics*, Vol. 19, No. 17, 2926–2929 (1980) by D. A. Jackson, R. Priest, A. Dandridge, and A. B. Tveten.

The stabilized tunable optical filtering system using a fiber-optic polarimetric interferometer includes a stabilization light source, a first polarized beam splitter (PBS), a phase modulator, a second PBS, two wavelength division multiplexers, two output terminals and stabilization electronics. There are three optical nodes of a first, a second, and a third, A, B and C, respectively, between the two PBS's.

The stabilization light source is to stabilize the interferometer. The wavelength of the stabilization light source should be different from the wavelength of the signal to be filtered. For example, in order to implement an optical filter operating in a 1550 nm optical communication band, a laser diode of 1300 nm may be used as the stabilization light source.

The first PBS consists of two input ports and one output port. It polarizes two lights, a stabilization light source from one input port and a light source to be filtered from the other input port, and supplies them to the PMF through its output port.

At the first optical fiber node where the output port of the first PBS is connected to the PMF with the angle of 45 degree between their birefringent axes, each polarized light is divided to the two birefringent axes of the PMF with the same intensity. After the divided lights propagate through the two birefringent axes of the PMF, they are combined at the second optical fiber node where the end of the PMF is connected to the input port of the second PBS with the angle of 45 degree between their birefringent axes.

There are four interference signals in the input port of the second PBS since each birefringent axis of the second PBS carries two interference signals originating from the two input polarized lights, respectively. The four interference signals are separated by the second PBS into two groups, which are supplied to the first output terminal and the second output terminal, respectively.

Two interference signals are mixed in each output port of the second polarization beam splitter. One originates from the stabilization light source and the other originates from the light to be filtered. They are split in two by the wavelength division multiplexer. The interference signals from the light to be filtered pass through the output terminals, and the other interference signals go to the stabilization electronics The output voltage from the stabilization electronics operates the phase modulator. The phase modulator is installed at the position that corresponds to the optical path of the interferometer. A device of fiber wrapped around a piezoelectric tube may implement the phase modulator. The phase modulator electrically adjusts the length of the optical fiber according to the feedback voltage from the stabilization electronics. It maintains the phase difference between the two optical paths in the PMF at a certain constant value. In other words, if the phase difference is varied by an external influence, the stabilization electronics compensates for the phase difference variation.

The optical path-length difference between the two optical paths changes as the wavelength of the stabilization light source changes in the interferometer filtering system. As the optical path-length difference changes, terms representing phase in equation 1 and equation 2 change and the transmission wavelength of the optical filter changes. As a result, if the wavelength of the stabilization light source is controllable, the wavelength tunable interferometer filter system whose transmission wavelength is tunable may be implemented. When the stabilization light source is implemented by a distributed feedback (DFB) laser diode, its wavelength may be adjusted by controlling operational temperature.

According to equation 2, the transmission wavelength spacing is inversely proportional to l, the length of the polarization maintaining fiber between point A and point B. Therefore, the transmission wavelength spacing can be varied by proper adjustment of the PMF length. However, sometimes the length l is not allowed within a certain length due to the fiber length necessary for fabricating the phase modulator. In such cases, PMF's may be spliced with rotating one fiber 90 degree at one point C between A and B. Then the phase difference between the point A and the point B is not proportional to the overall length l, but proportional to the length difference ($l_1-l_2$). Regardless of the length of the PMF, a proper selection of the point C enables selection of suitable transmission wavelength spacing.

With the help of the active phase tracking method with independent stabilization light source and polarimetric interferometer scheme with polarization maintaining fiber, the disclosed embodiment of the present invention stabilizes transmission wavelength and removes problems caused by polarization fluctuation. The disclosed embodiment readily changes transmission wavelength of the interferometer filter by changing the wavelength of the stabilization light source.

Although preferred embodiments of the invention have been disclosed for illustrative purposes, those skilled in the art will appreciate that various modifications, additions and substitutions are possible without departing from the scope and spirit of the invention as recited in the accompanying claims.

What we claim:

1. A tunable optical filtering system, comprising:
  a stabilization light source for supplying stabilization light;
  a first polarization beam splitter for polarizing said stabilization light and the input light to be filtered and generating polarized light;
  a first optical fiber node for connecting the output of said first polarization beam splitter with polarization maintaining fibers with the angle of 45 degrees between their birefringent axes and for splitting said polarized light;
  a plurality of polarization maintaining optical fibers for carrying said split light by said first optical fiber node;
  a phase modulator for maintaining phase difference between two birefringent axes of said polarization maintaining fibers;
  stabilization electronics for supplying a feedback signal to said phase modulator;
  a second optical fiber node for connecting said polarization maintaining fibers with the input of the second polarization beam splitter with the angle of 45 degrees between their birefringent axes, receiving split light by said first optical fiber node, and generating interference signals;
  a second polarization beam splitter for dividing said interference signals into output signals by the polarization axes; and
  two wavelength division optical multiplexers for dividing said output signals into signals for said stabilization electronics and filtered signals by wavelengths.

2. The tunable optical filtering system of claim 1, wherein said stabilization light source comprises a light source whose wavelength is tunable in order to adjust the wavelength of said filtered signal.

3. The tunable optical filtering system of claim 1, wherein the system further comprises a third optical fiber node within said polarization maintaining fibers for transmission between said first and said second optical fiber node in order to make the transmission fibers connected with the angle of 90 degrees between their birefringent axes.

* * * * *